US012585145B2

(12) United States Patent
Zhang et al.

(10) Patent No.: US 12,585,145 B2
(45) Date of Patent: Mar. 24, 2026

(54) SMART WEARABLE GLASSES

(71) Applicant: AAC ACOUSTIC TECHNOLOGIES (SHENZHEN) CO., LTD., Shenzhen (CN)

(72) Inventors: Xin Zhang, Shenzhen (CN); Yiming Meng, Shenzhen (CN); Shuyuan Sun, Shenzhen (CN); Xiang Huang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 395 days.

(21) Appl. No.: 18/330,326

(22) Filed: Jun. 6, 2023

(65) Prior Publication Data

US 2024/0201520 A1     Jun. 20, 2024

Related U.S. Application Data

(63) Continuation of application No. PCT/CN2022/144401, filed on Dec. 31, 2022.

(30) Foreign Application Priority Data

Dec. 19, 2022     (CN) .......................... 202211634280.2

(51) Int. Cl.
*G02C 11/00*           (2006.01)
(52) U.S. Cl.
CPC .................................... *G02C 11/10* (2013.01)
(58) Field of Classification Search
CPC .......... G02C 11/10; G02C 11/06; G02C 5/14; H04R 1/28; H04R 1/025; H04R 1/347; H04R 1/2826; H04R 1/2849; H04R 1/2815; H04R 1/2838
USPC .................................................... 381/327, 337
See application file for complete search history.

(56) References Cited

U.S. PATENT DOCUMENTS

2019/0342644 A1* 11/2019 Chen ...................... H04R 1/288
2020/0304905 A1*  9/2020 Oishi ...................... H04R 5/033

FOREIGN PATENT DOCUMENTS

| CN | 110568633 A | * | 12/2019 | .......... H04R 1/1091 |
| CN | 209982709 U | * | 1/2020 | ............ G02C 11/00 |
| CN | 110971732 A | * | 4/2020 | ............ H04M 1/035 |
| CN | 113946061 A | * | 1/2022 | ............ H04R 1/025 |

* cited by examiner

*Primary Examiner* — Duc Nguyen
*Assistant Examiner* — Chimezie Ezeriwe Bekee
(74) *Attorney, Agent, or Firm* — Wiersch Law Group

(57)          ABSTRACT

Smart wearable glasses include a frame, temples, a vibration unit, and a sounding unit including a housing having an accommodation space and an inverted channel, a sounding driver fixed in the accommodation space, and an inverted tube. A first sound outlet hole, a first inverted hole, and a first leakage hole are arranged through the housing. The accommodation space is separated into a front cavity and a coupled rear cavity. The front cavity is connected to the outside world through the first sound outlet hole. The inverted tube is connected to the outside world through the inverted channel and the first inverted hole. The coupled rear cavity is connected to the outside world through the first leakage hole and the inverted tube. A phase of an acoustic wave emitted through the first sound outlet hole is opposite to that of an acoustic wave emitted through the first leakage hole.

8 Claims, 13 Drawing Sheets

100

<u>100</u>

3

A-A

4

SMART WEARABLE GLASSES

TECHNICAL FIELD

The present application relates to the field of electroacoustic conversion, in particular to smart wearable glasses.

BACKGROUND

Smart wearable glasses have gained widespread adoption across diverse domains, including communication, education, healthcare, culture, and manufacturing. The acoustic performance of smart wearable glasses has emerged as a crucial determinant of user experience.

The smart wearable glasses in the related art include a frame, hollow-structured temples extending from opposite sides of the frame, and a vibration component and a sounding unit fixedly arranged in the temples, respectively. The sounding unit is configured to transmit mid-to-low frequency sounds to the ears through sound outlet holes in the temples, thereby ensuring audio quality. An inner side of the vibration component is in direct contact with the skull, facilitating the transmission of mid-to-high frequency acoustic waves to the ears, and enabling audio playback in the smart wearable glasses.

However, the sound emitted from the sounding unit of smart wearable glasses in the related art is subject to high-frequency attenuation as it passes through the sound outlet holes in the temples and then transmitted to the user's ears. Additionally, the open-air interaction sounds directly radiate into the air, which compromises privacy protection and results in significant sound leakage, especially in the low-frequency range of 100 Hz to 450 kHz where the sound pressure level (SPL) is relatively low. Although the use of bone conduction open auditory interaction in the vibration components can reduce sound leakage and improve privacy, the excessive vibration amplitude of low-frequency sound in bone conduction may cause discomfort to the user. Therefore, it is a technical challenge that needs to be addressed to improve the low-frequency sound propagation of smart wearable glasses, increase the sound pressure level (SPL), and reduce sound leakage, thereby enhancing the acoustic performance of smart wearable glasses.

Therefore, it is necessary to provide novel smart wearable glasses to address the above-mentioned technical problem.

SUMMARY

An objective of the present application is to provide smart wearable glasses with superior acoustic performance.

In order to achieve the above-mentioned objective, embodiments of the present application provides smart wearable glasses, comprising: a frame, temples extending from opposite sides of the frame, the temples being of hollow structure, a vibration unit fixed in the temples, comprising a bone conduction contact portion at least partially exposed in the temples, configured to contact user's skull and transmit a vibration acoustic signal generated by the vibration unit to a user by means of bone conduction; and a sounding unit fixed in the temples, comprising a housing having an accommodation space and an inverted channel, wherein a first sound outlet hole, a first inverted hole and a first leakage hole are arranged through the housing; a sounding driver fixed in the accommodation space, and separating the accommodation space into a front cavity and a coupled rear cavity; the front cavity being connected to the outside world through the first sound outlet hole; and an inverted tube arranged in the inverted channel, connected to the outside world through the inverted channel and the first inverted hole in sequence, wherein the coupled rear cavity is connected to the outside world through the first leakage hole and the inverted tube; wherein a phase of an acoustic wave emitted by the sounding unit through the first sound outlet hole is opposite to a phase of an acoustic wave emitted by the sounding unit through the first leakage hole.

In one embodiment, the temples comprise a first body extending from the frame, a first cover fixedly covered on the first body, enclosing a first acoustic cavity together with the first body, a second sound outlet hole, a second inverted hole, and a second leakage hole respectively arranged through the first body; wherein the sounding unit is fixedly accommodated in the first acoustic cavity; the first sound outlet hole is connected to the outside world through the second sound outlet hole, the first inverted hole is connected to the outside world through the second inverted hole, and the first leakage hole is connected to the outside world through the second leakage hole.

In one embodiment, the temples comprise a second body extending from the frame, and a second cover fixedly covered on the second body, enclosing a second acoustic cavity together with the second body; wherein the housing is formed by an extension of the second body towards the second acoustic cavity, and the sounding unit is fixedly accommodated in the second acoustic cavity; the first sound outlet hole, the first inverted hole, and the first leakage hole are arranged through the second body, respectively.

Preferably, the temples comprise a lower surface that rests on user's ears when worn, an upper surface opposite to the lower surface, a first side surface, and a second side surface; wherein the first side surface and the second side surface are connected to the upper surface and the lower surface and are located opposite to each other; the second sound outlet hole and the second inverted hole are spaced apart on the lower surface; the second leakage hole is located on the upper surface; the first side surface is located on a side closer to the user, and the first cover is located on the first side surface.

In one embodiment, there are a plurality of the first leakage holes and a plurality of the second leakage holes, and the first leakage holes correspond one-to-one with the second leakage holes.

In one embodiment, the housing comprises a bottom wall fixedly accommodated in the first acoustic cavity; a side wall extending from a periphery of the bottom wall to the first acoustic cavity in a curved manner; a top cover covered on the side wall; a support wall extending from the bottom wall toward the top cover; and an inverted tube cover; wherein the bottom wall, the side wall, the support wall, and the inverted tube cover together enclose the inverted channel; the bottom wall, the side wall, the support wall and the top cover together enclose the accommodation space; and the first sound outlet hole, the first inverted hole, and the first leakage hole are arranged through the side wall, respectively.

In one embodiment, a size of the inverted tube is calculated based on a volume of the front cavity, a volume of the coupled rear cavity, and a Thiele-Small (TS) parameter of the sounding driver.

In one embodiment, the vibration unit further comprises a vibrator configured to generate the vibration acoustic signal; a vibration conduction layer attached to a surface of the vibrator; and a vibration coupled anvil attached to the vibration conduction layer; wherein the bone conduction contact portion is attached to a side of the vibration coupled anvil away from the vibration conduction layer, and the vibration coupled anvil forms a bone conduction structure by coupling with the user's skull through the bone conduction contact portion.

In one embodiment, the bone conduction contact portion is made of a flexible sound-conducting medium.

In one embodiment, the vibration unit and the sounding unit generate sound separately by means of frequency division, wherein the frequency division comprises a physical frequency division and a software frequency division.

Compared to the related art, the smart wearable glasses provided by the present application incorporate a sounding unit and a vibration unit in the temples. The housing of the sounding unit is designed with an inverted channel and a first inverted hole, with an inverted tube arranged inside the inverted channel. The inverted tube is connected to the outside world through the first inverted hole. This acoustic structure utilizing the inverted tube significantly enhances the low-frequency performance of the sounding unit. The housing is provided with an accommodation space, a first sound outlet hole, and a first leakage hole, and the accommodation space is divided into a front cavity and a coupled rear cavity by the sounding driver. The front cavity is connected to the outside world through the first sound outlet hole, and the coupled rear cavity is connected to the outside world through the first leakage hole and the inverted tube. A phase of an acoustic wave emitted by the sounding unit through the first sound outlet hole is opposite to a phase of an acoustic wave emitted by the sounding unit through the first leakage hole. This acoustic structure utilizes the first sound outlet hole and the first leakage hole and significantly reduces the leakage of low-frequency sound in the sounding unit based on the principle of anti-phase acoustic wave cancellation. The vibration unit directly contacts the ears to transmit sound to the ears, avoiding sound leakage and ensuring privacy in the mid-to-high frequency range, resulting in reduced sound leakage across the entire frequency range and improved privacy. This enhances the user experience and contributes to the superior acoustic performance of the smart wearable glasses provided by the present application.

BRIEF DESCRIPTION OF THE DRAWINGS

In order to illustrate technical solutions of embodiments of the present application more clearly, the accompanying drawings required in the embodiments will be briefly introduced below. Obviously, the accompanying drawings in the following description are only some embodiments of the present application. For those of ordinary skill in the art, other accompanying drawings may also be obtained from these accompanying drawings without creative effort.

DETAILED DESCRIPTION OF THE EMBODIMENTS

Figure 1:
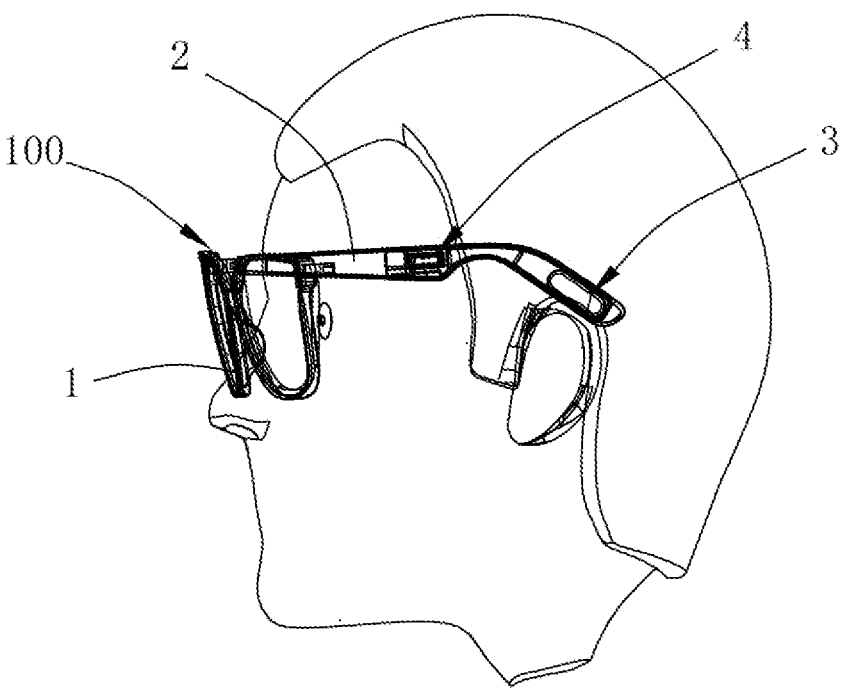
FIG. 1 is a diagram of smart wearable glasses according to an embodiment of the present application.
Figure 2:
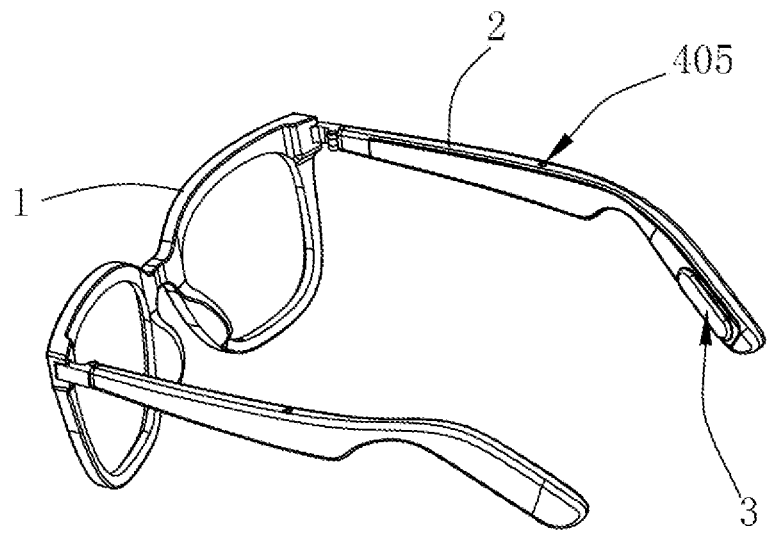
FIG. 2 is a diagram showing a three-dimensional structure of the smart wearable glasses according to Embodiment 1 of the present application.
Figure 3:
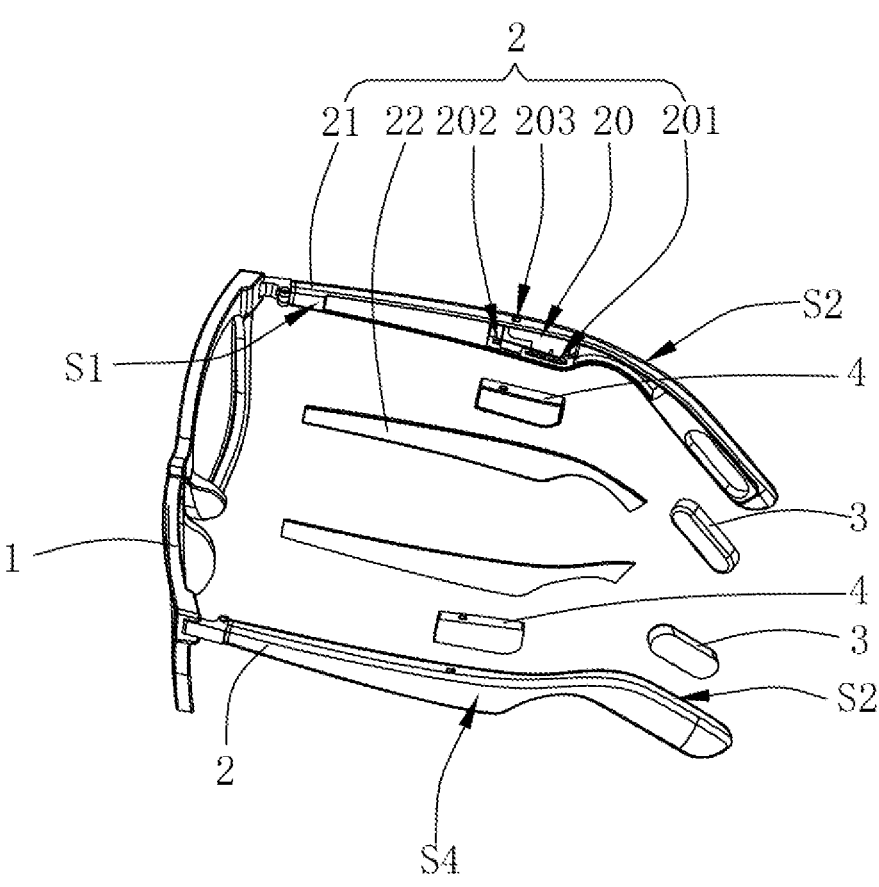
FIG. 3 is an exploded view of a partial three-dimensional structure of the smart wearable glasses according to Embodiment 1 of the present application.
Figure 4:
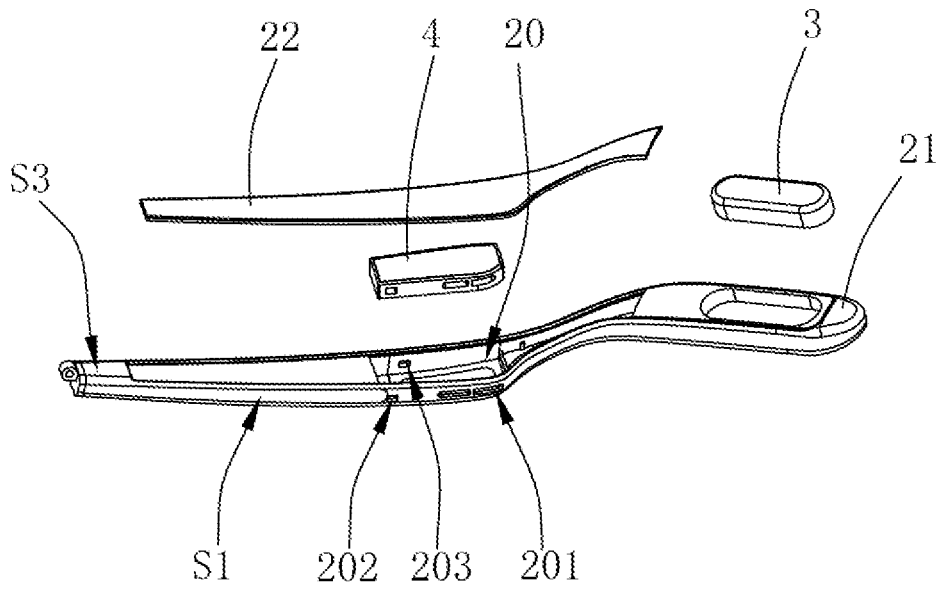
FIG. 4 is an exploded view of a partial three-dimensional structure of temples, a vibration unit, and a sounding unit of the smart wearable glasses according to Embodiment 1 of the present application.
Figure 5:
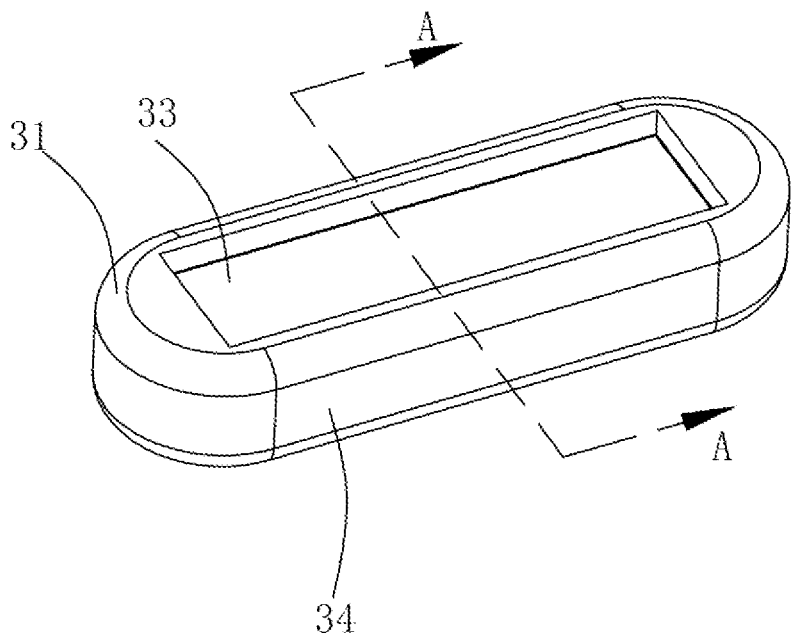
FIG. 5 is a diagram showing a three-dimensional structure of the vibration unit of the smart wearable glasses according to Embodiment 1 of the present application.
Figure 6:
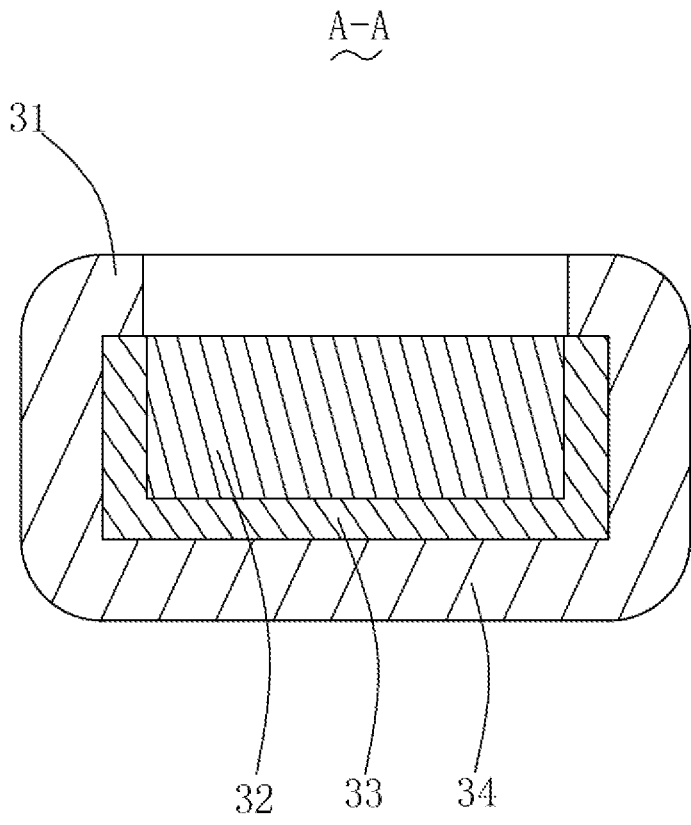
FIG. 6 is a sectional view taken along a line A-A in FIG. 5.
Figure 7:
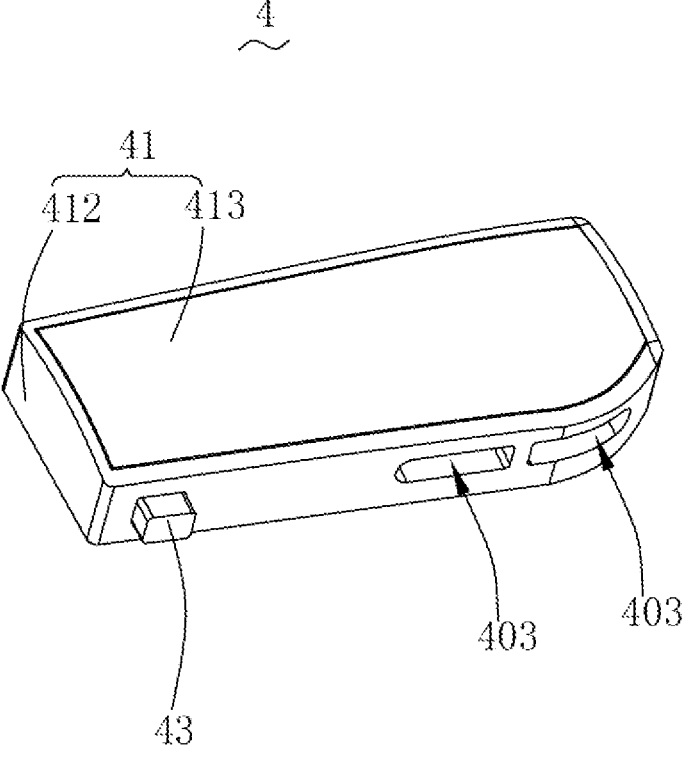
FIG. 7 is a diagram showing a three-dimensional structure of the sounding unit of the smart wearable glasses according to Embodiment 1 of the present application.
Figure 8:
FIG. 8 is an exploded view of a partial three-dimensional structure of the sounding unit of the smart wearable glasses according to Embodiment 1 of the present application.
Figure 8:
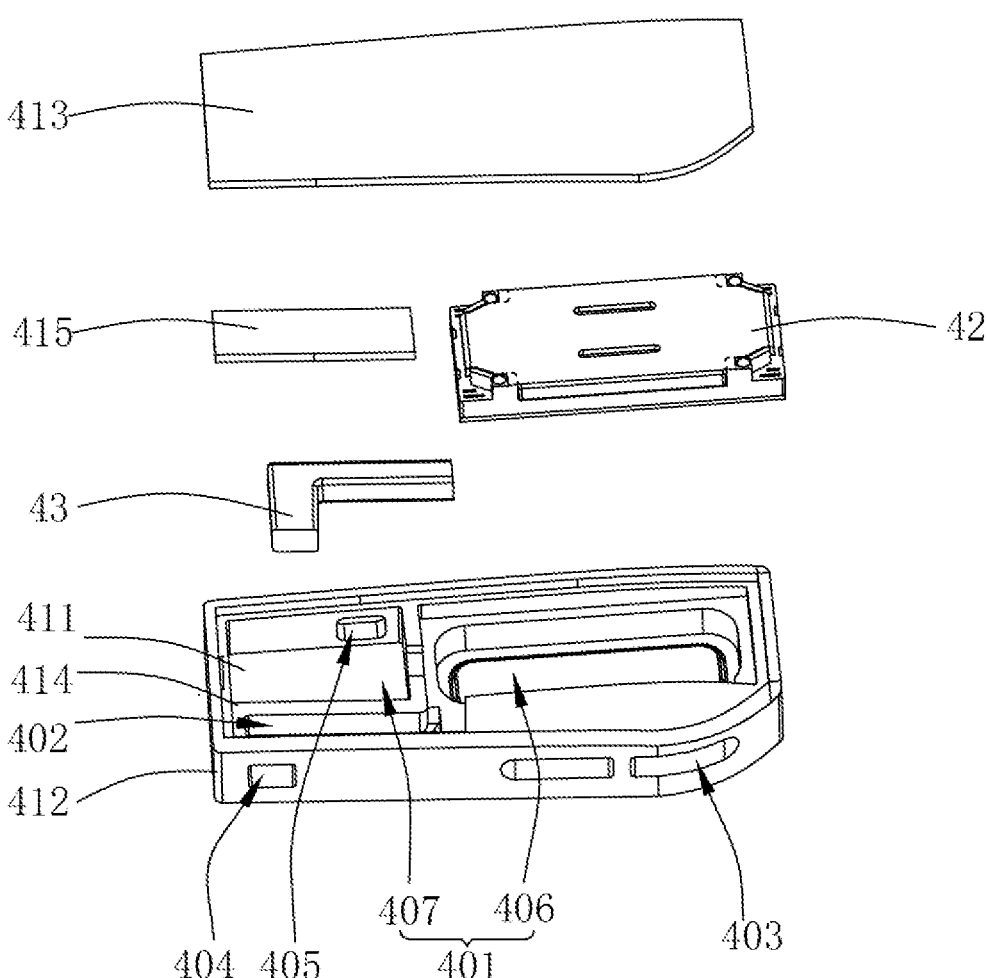
Figure 9:
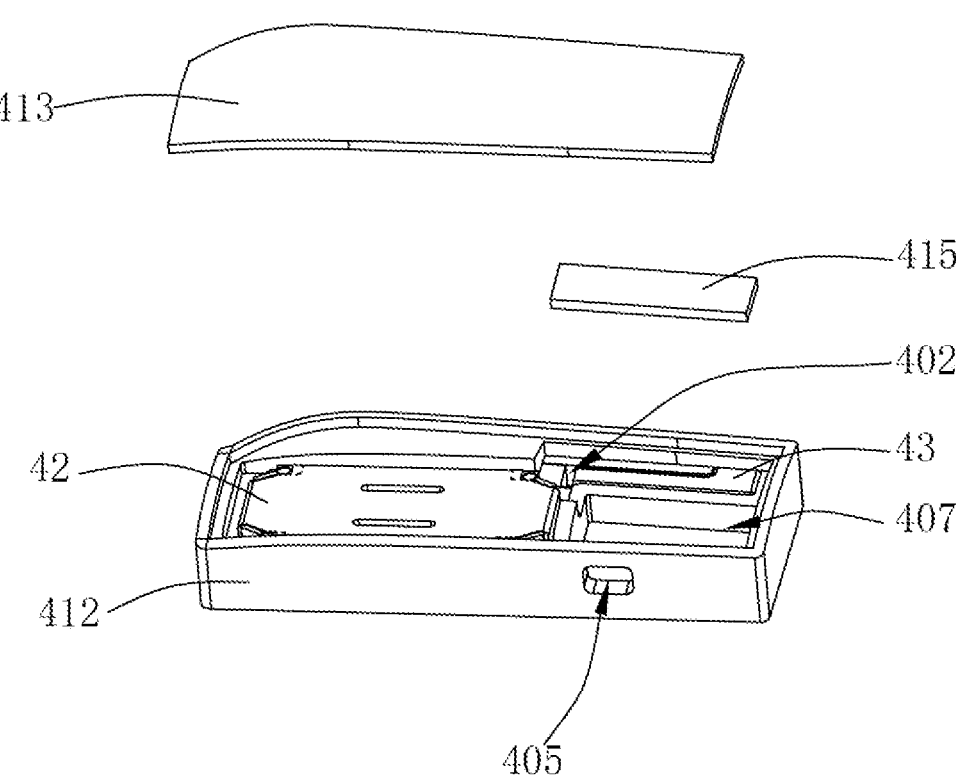
FIG. 9 is an exploded view of another partial three-dimensional structure of the sounding unit of the smart wearable glasses according to Embodiment 1 of the present application.

The technical solutions of embodiments of the present application will be clearly and comprehensively described below in conjunction with the accompanying drawings of the embodiments. Obviously, the described embodiments are only a part of rather than all of the embodiments of the present application. Based on the embodiments of the present application, other embodiments obtained by those of ordinary skill in the art without making creative labor also belong to the protection scope of the present application.

Embodiment 1

The present application provides smart wearable glasses 100.

Please refer to FIGS. 1-9.

The smart wearable glasses 100 include a flame 1, temples 2, a vibration unit 3, and a sounding unit 4.

The frame 1 may be configured to fix lenses, although it is also possible to use it without fixing lenses.

The temples 2 are extended from two opposite sides of the frame 1. There are two temples 2, and the two temples 2 are symmetrically and mirror-image arranged.

The temples 2 is configured as a hollow structure and is configured to fix the vibration unit 3 and the sounding unit 4.

Specifically, the temples 2 includes a first body 21 extending from the frame 1, a first cover 22 covered on the first body 21 and enclosing a first acoustic cavity 20 together with the first body 21, and a second sound outlet hole 201, a second inverted hole 202 and a second leakage hole 203 arranged through the first body 21, respectively.

The temples 2 include a lower surface S1 that rests on user's ears when worn, an upper surface S2 opposite to the lower surface S1, and a first side surface S3 and a second side surface S4 that connect the upper surface S2 and the lower surface S1 and arranged oppositely. The second sound outlet hole 201 and the second inverted hole 202 are spaced apart on the lower surface S1. This arrangement helps to reduce sound leakage.

The second leakage hole 203 is located on the upper surface S2. The second leakage hole 203 and the second sound outlet hole 201 are arranged on the upper surface S2 and the lower surface S1, respectively. According to the principle of acoustic wave phase inverted cancellation, the low-frequency sound leakage in the sounding unit 4 is greatly reduced.

The first side surface S3 is located a side close to the user, and the first cover 22 is located on the first side surface S3.

The vibration unit 3 is fixedly arranged in the temples 2. In Embodiment 1, the vibration unit 3 is fixedly arranged at one end of the temples 2 away from the flame 1.

Specifically, the vibration unit 3 includes a bone conduction contact portion 31, a vibrator 32, a vibration conduction layer 33, and a vibration coupled anvil 34.

The bone conduction contact portion 31 is at least partially exposed to the temples 2. The bone conduction contact portion 31 is configured to be directly in contact with a user's skin. The bone conduction contact portion 31 is configured to contact the user's skull and transmit a vibration acoustic signal generated by the vibration unit 3 to the user by means of bone conduction.

When the smart wearable glasses 100 are worn, the bone conduction contact portion 31 directly contacts the skin near the user's ears. The bone conduction contact portion 31 is made of a soft material. In Embodiment 1, the bone conduction contact portion 31 is a flexible acoustic conduction medium, which may specifically be a rubber layer or a foam layer. On the one hand, the wearing comfort of the smart wearable glasses 100 may be increased, and on the other hand, the vibration isolation between the vibration unit 3 and the temples 2 may be increased, resulting in superior acoustic performance and enhanced auditory comfort.

The vibrator 32 generates the vibration acoustic signal.

In Embodiment 1, the vibrator 32 is one of a motor, an actuator, and a bone conduction transducer. In one embodiment, the vibrator 32 is an actuator for inertial vibration, so as to exclusively excite and generate the low-frequency vibration acoustic signal.

The vibration conduction layer 33 is attached to a surface of the vibrator 32. The vibration conduction layer 33 and the vibration coupled anvil 34 may be separated or integrated.

The vibration coupled anvil 34 is attached to the vibration conduction layer 33, and the bone conduction contact portion 31 is attached to a side of the vibration coupled anvil 34 away from the vibration conduction layer 33. The vibration coupled anvil 34 forms a bone conduction structure by coupling with the user's skull through the bone conduction contact portion 31.

The vibration coupled anvil 34 is matched in shape and size with the bone coupled thereto, that is to say, the vibration coupled anvil 34 may be coupled to the skull at a position corresponding to the head of the human body in shape and size, and may be a non-metallic component having a certain rigidity, such as plastic.

The sounding unit 4 is fixedly arranged inside the temples 2.

Specifically, the sounding unit 4 includes a housing 41, a sounding driver 42, and an inverted tube 43.

The housing 41 has an accommodation space 401 and an inverted channel 402. A first sound outlet hole 403, a first inverted hole 404, and a first leakage hole 405 are arranged through the housing 41. The first sound outlet hole 403 is connected to the outside world through the second sound outlet hole 201. The first inverted hole 404 is connected to the outside world through the second inverted hole 202. The first leakage hole 405 is connected to the outside world through the second leakage hole 203.

The housing 41 includes a bottom wall 411 fixedly accommodated in the first acoustic cavity 20, a side wall 412 extending from the periphery of the bottom wall 411 towards the first acoustic cavity 20 in a bending manner, a top cover 413 covered the side wall 412, a support wall 414 formed by extending from the bottom wall 411 towards the top cover 413, and an inverted tube cover 415.

The bottom wall 411, the side wall 412, the support wall 414 and the inverted tube cover 415 together enclose the inverted channel 402.

The bottom wall 411, the side wall 412, the support wall 414, and the top cover 413 together enclose the accommodation space 401.

The first sound outlet hole 403, the first inverted hole 404, and the first leakage hole 405 are arranged through the side wall 412, respectively.

The sounding driver 42 is fixed in the accommodation space 401. Specifically, the sounding unit 4 is fixedly accommodated in the first acoustic cavity 20.

The sounding driver 42 divides the accommodation space 401 into a front cavity 406 and a coupled rear cavity 407. The front cavity 406 is connected to the outside world through the first sound outlet hole 403. The acoustic signal emitted by the sounding driver 42 is transmitted through the front cavity 406 and then through the first sound outlet hole 403, propagating in the free field near the ear, delivering the mid-to-high frequency acoustic signal to the human ears.

In one embodiment, the first sound outlet hole 403 is located at a position of a human ear pinna and is arranged towards a direction of a human ear, that is to say, in order to cooperate with the first sound outlet hole 403, the second sound outlet hole 201 is arranged at a position where the temples 2 corresponds to the first sound outlet hole 403. The second sound outlet hole 201 is located on the lower surface S1 of the temples 2, that is, the second sound outlet hole 201 is also located at the position of the human ear pinna and is arranged towards the direction of the human ear. In an embodiment, a cross-sectional shape of the first sound outlet hole 403 approximates a shape of a human ear pinna at a position where the first sound outlet hole 403 is located, and this structure enables a human ear to receive the acoustic signal of the sounding unit 4 better.

The coupled rear cavity 407 is connected to the outside world through the first leakage hole 405 and the inverted tube 43.

A phase of an acoustic wave emitted by the sounding unit 4 through the first sound outlet hole 403 is opposite to a phase of an acoustic wave emitted by the sounding unit 4 through the first leakage hole 405. The structure utilizes the acoustic structure with the first sound outlet hole 403 and the first leakage hole 405, and employs the principle of acoustic wave phase cancellation to significantly reduce the sound leakage of the low frequency from the sounding unit 4. This effectively prevents sound leakage, enhances privacy, and improves the acoustic performance of the smart wearable glasses 100 provided by the present application.

In Embodiment 1, there are a plurality of first leakage holes 405 and a plurality of second leakage holes 203, and the first leakage holes 405 correspond one-to-one with the second leakage holes 203. This configuration facilitates the collective adjustment of the sound leakage at various angles for the smart wearable glasses 100 provided by the present application, through multiple first leakage holes 405. As a result, the acoustic performance of the smart wearable glasses 100 provided by the present application is improved.

The inverted tube 43 is arranged in the inverted channel 402, and is connected to the outside world through the inverted channel 402 and the first inverted hole 404 in sequence. The acoustic structure of the inverted tube 43 in this configuration may significantly enhance the low-frequency performance of the sounding unit 4, allowing the sound to be amplified and the bass to be reinforced through the inverted channel 402 and the first inverted hole 404. After the arrangement of the inverted tube 43, there will be a strong acoustic wave emitted from the first inverted hole 404, and the sounding unit 4 may utilize the acoustic wave from both the first sound hole 403 and the first inverted hole 404, resulting in the improved sound quality of the sounding unit 4. As a result, the smart wearable glasses 100 provided by the present application have excellent acoustic performance.

In Embodiment 1, the size of the inverted tube 43 is calculated based on the volume of the front cavity 406, the volume of the coupled rear cavity 407, and a Thiele-Small (TS) parameter of the sounding driver 42. The sizes of the inverted tube 43 matched with different components of the sounding unit 4 are different, and this structure may greatly improve the low-frequency response of the sounding unit 4.

In Embodiment 1, the vibration unit 3 and the sounding unit 4 generate sound separately by means of frequency division. The frequency division includes physical frequency division and software frequency division. By means of frequency division, the sounding unit 4 works in a middle or low-frequency band, and the vibration unit 3 works in a middle or high-frequency band, ensuring excellent acoustic performance for the smart wearable glasses 100 provided by the present application. The vibration unit 3 and the sounding unit 4 form frequency band advantages complementary to each other, so as to realize the reproduction of broadband sound in a low-frequency band and a middle-high frequency band of the smart wearable glasses 100, where the frequency band is wide and the acoustic performance is good. Meanwhile, after compensating the low-frequency sound band of the sounding unit 4, the vibration unit 3 eliminates the need to increase the size of the sounding unit 4 to improve the low-frequency effect, thus avoiding the leakage of middle-frequency and high-frequency sound, effectively improving the sound privacy problem of the smart wearable glasses 100, and making the user experience better.

The empirical measurements of the prototype model of the smart wearable glasses 100, as demonstrated in Embodiment 1, are presented below for comparative analysis through plotted curves.

Figure 10:
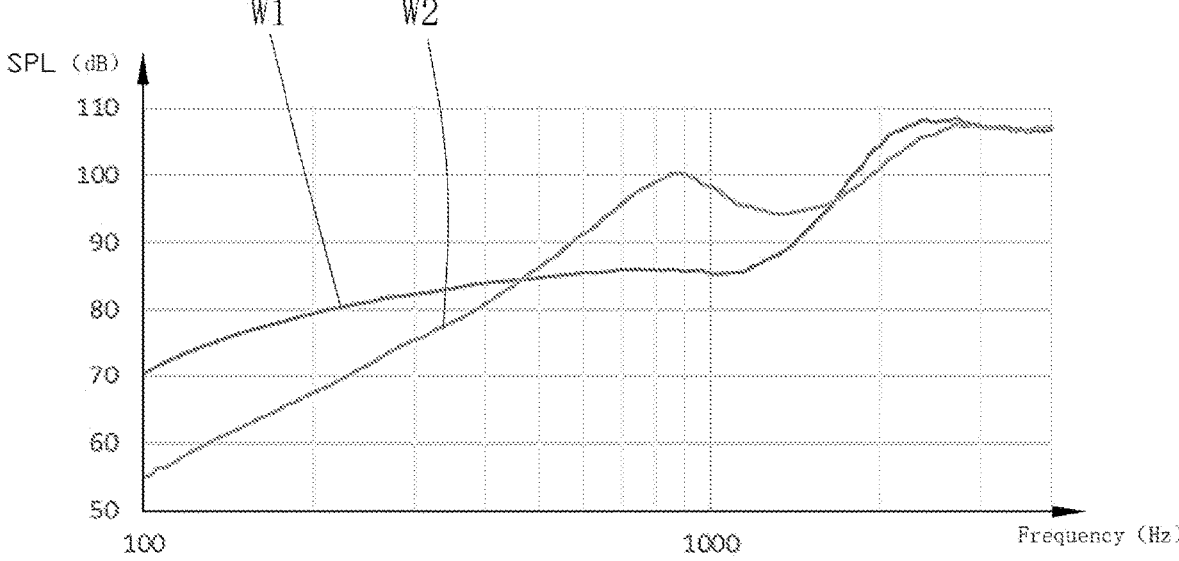
FIG. 10 shows a comparative graph of the sound pressure level versus frequency relationship between the smart wearable glasses of Embodiment 1 of the present application and the smart wearable glasses of the related art.

Referring to FIG. 10, FIG. 10 shows a comparative graph of the sound pressure level versus frequency relationship between the smart wearable glasses 100 of Embodiment 1 of the present application and the smart wearable glasses of the related art.

In FIG. 10, W1 represents the sound pressure level versus frequency relationship of the smart wearable glasses 100, while W2 represents the sound pressure level versus frequency relationship of the smart wearable glasses in the related art. The differences between the smart wearable glasses 100 in Embodiment 1 of the present application and the smart wearable glasses in the related art are as follows.

Compared with the smart wearable glasses in the related art, the smart wearable glasses 100 in Embodiment 1 of the present application are added with structures corresponding to the first leakage holes 405 and the first inverted holes 404 respectively.

As shown in FIG. 10, by means of the smart wearable glasses 100 in the present application, the low-frequency response can be greatly improved, the frequency band at 450 Hz can be increased, and the low frequency at 100 Hz can be improved up to 16 dB.

Figure 11:
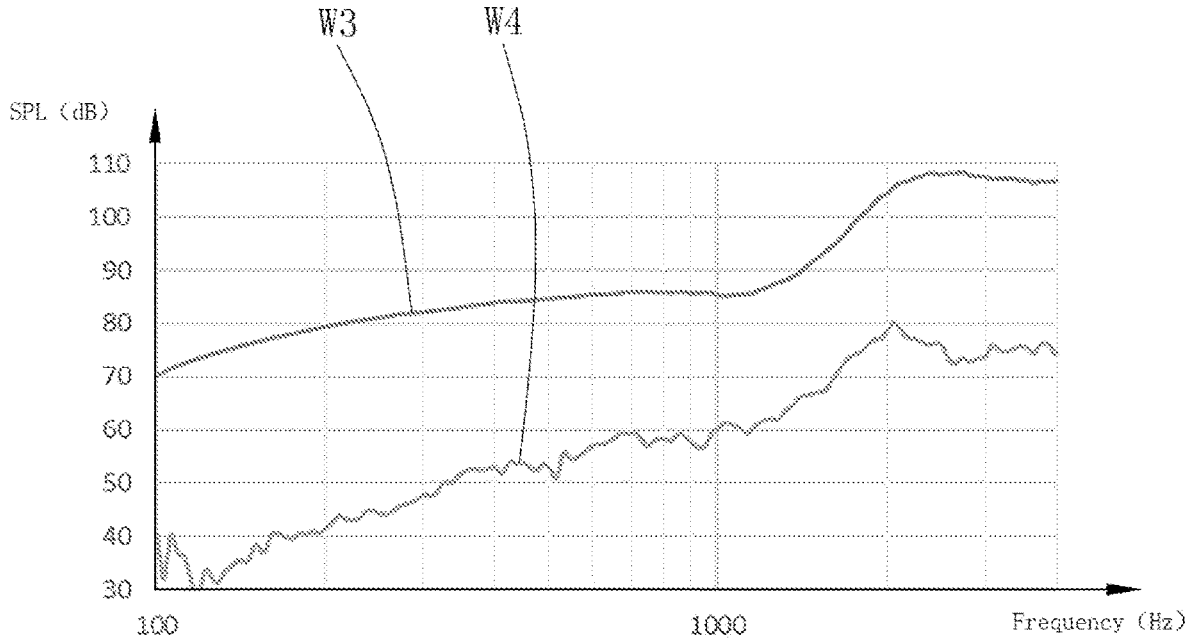
FIG. 11 shows a comparative graph of the sound pressure level versus frequency relationship between the smart wearable glasses 100 of Embodiment 1 of the present application, located externally to the user's ear, and the smart wearable glasses of the related art, located internally in the ear.

Referring to FIG. 11, FIG. 11 shows a comparative graph of the sound pressure level versus frequency relationship between the smart wearable glasses 100 of Embodiment 1 of the present application, located externally to the user's ear, and the smart wearable glasses of the related art, located internally in the ear.

In FIG. 11, W3 represents the sound pressure level versus frequency relationship of the smart wearable glasses of the related art at the inner position of the ear, while W4 represents the sound pressure level versus frequency relationship of the smart wearable glasses 100 at a distance of 20 cm outside the ear. Compared with the smart wearable glasses in the related art, the smart wearable glasses 100 in Embodiment 1 of the present application are added with structures corresponding to the first leakage holes 405 and the first inverted holes 404 respectively. As shown in FIG. 11, there is a significant difference in the audio response between W3 and W4 for the users. The difference is greater than 25 dB in the frequency range of 100 Hz-4 kHz, with the maximum difference potentially exceeding 40 dB, indicating an excellent sound leakage prevention effect. Moreover, the frequency range above 4 kHz is primarily transmitted to the human ear through bone conduction using vibration devices, resulting in a high level of privacy.

In conclusion, the smart wearable glasses 100 provided by the present application adopt an acoustic structure with an inverted tube 43, which significantly improves the low-frequency performance of the sounding unit 4. Moreover, the principle of acoustic wave inverted and cancellation is utilized to greatly reduce sound leakage in the low-frequency range of the sounding unit 4. The vibration unit 3 transmits sound to the ear by directly contacting with user's skull, avoiding sound leakage and ensuring privacy in the mid to high-frequency range. This results in reduced sound leakage and improved privacy across the entire frequency spectrum, thereby ultimately providing an enhanced user experience. Therefore, the smart wearable glasses 100 provided by the present application exhibit excellent acoustic performance.

Embodiment 2

Figure 12:
FIG. 12 is a diagram showing a three-dimensional structure of the smart wearable glasses according to Embodiment 2 of the present application.
Figure 12:
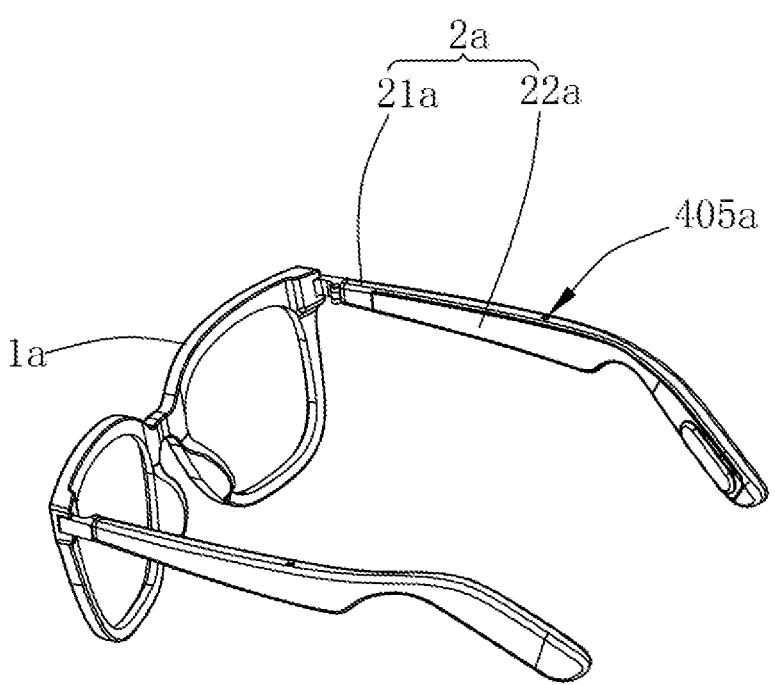
Figure 13:
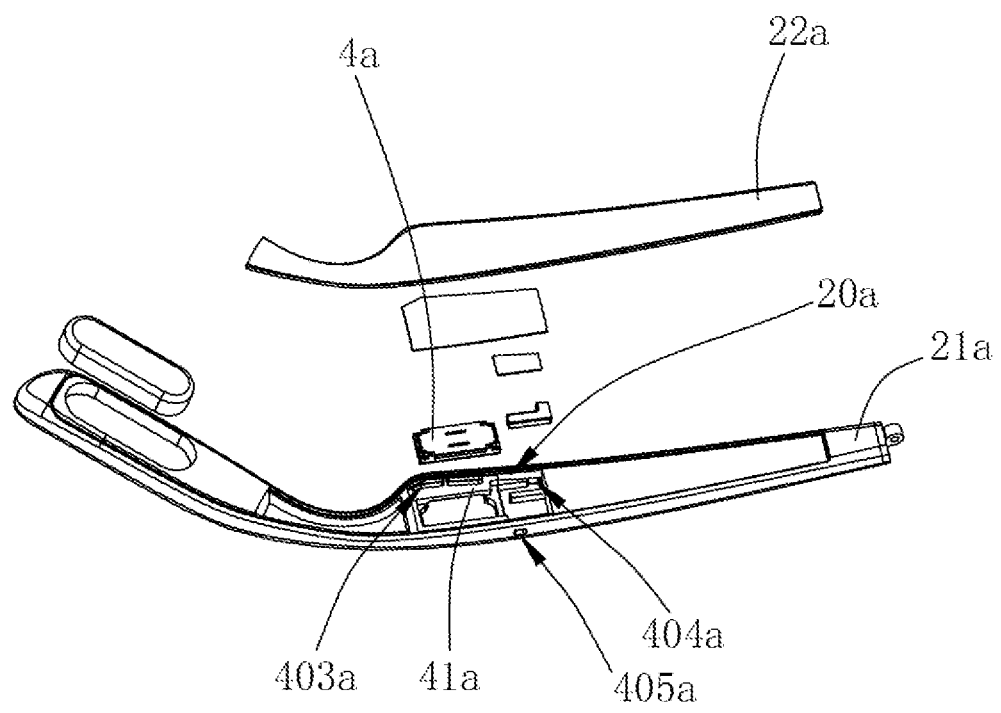
FIG. 13 is an exploded view of a partial three-dimensional structure of temples and a sounding unit of the smart wearable glasses according to Embodiment 2 of the present application.

Embodiment 2 of the present application further provides smart wearable glasses 100a. Referring to FIGS. 12 and 13, FIG. 12 is a schematic diagram showing a three-dimensional structure of the smart wearable glasses 100a according to Embodiment 2 of the present application. FIG. 13 is an exploded view of a partial three-dimensional structure of temples and a sounding unit 4a of the smart wearable glasses 100a according to Embodiment 2 of the present application.

The smart wearable glasses 100a of Embodiment 2 have the same basic structure as the smart wearable glasses 100 of Embodiment 1, and the difference therebetween are as follows.

The temples 2a include a second body 21a extended from the frame 1a and a second cover 22a fixedly covered on the second body 21a and forming a second acoustic cavity 20a together with the second body 21a.

The housing 41*a* is formed by an extension of the second body 21*a* toward the second acoustic cavity 20*a*.

The sounding unit 4*a* is fixedly accommodated in the second acoustic cavity 20*a*.

The first sound outlet hole 403*a*, the first inverted hole 404*a*, and the first leakage hole 405*a* are arranged through the second body 21*a*, respectively.

In the smart wearable glasses 100*a* of Embodiment 2, the housing 41*a* of the sounding unit 4*a* and the temples 2*a* are integrally designed. The structure simplifies the manufacturing process, reduces the material cost, and reduces the weight and volume of the smart wearable glasses 100*a*, so that the smart wearable glasses 100*a* of Embodiment 2 are well miniaturized and light in weight, thereby providing a good user experience.

Through the structure of the smart wearable glasses 100 in Embodiment 1 and the smart wearable glasses 100*a* in Embodiment 2, the low-frequency performance of the sounding unit may be greatly improved, and the low-frequency sound leakage in the sounding unit may be greatly reduced according to the principle of acoustic wave phase reversal cancellation, and the sound is directly transmitted to the inside of the ear by means of the vibration conduction from the bone through the vibration unit, thereby avoiding the phenomenon of sound leakage, and ensuring the privacy of the medium frequency and the high frequency. Therefore, the sound leakage of the full frequency band is reduced, and the privacy is improved, so as to provide a superior user experience and enhance the acoustic performance of the smart wearable glasses provided by the present application.

Compared to the related art, the smart wearable glasses provided by the present application incorporate a sounding unit and a vibration unit in the temples. The housing of the sounding unit is designed with an inverted channel and a first inverted hole, with an inverted tube arranged inside the inverted channel. The inverted tube is connected to the outside world through the first inverted hole. This acoustic structure utilizing the inverted tube significantly enhances the low-frequency performance of the sounding unit. The housing is provided with an accommodation space, a first sound outlet hole, and a first leakage hole, and the accommodation space is divided into a front cavity and a coupled rear cavity by the sounding driver. The front cavity is connected to the outside world through the first sound outlet hole, and the coupled rear cavity is connected to the outside world through the first leakage hole and the inverted tube. A phase of an acoustic wave emitted by the sounding unit through the first sound outlet hole is opposite to a phase of an acoustic wave emitted by the sounding unit through the first leakage hole. This acoustic structure utilizes the first sound outlet hole and the first leakage hole and significantly reduces the leakage of low-frequency sound in the sounding unit based on the principle of anti-phase acoustic wave cancellation. The vibration unit directly contacts the ears to transmit sound to the ears, avoiding sound leakage and ensuring privacy in the mid-to-high frequency range, resulting in reduced sound leakage across the entire frequency range and improved privacy. This enhances the user experience and contributes to the superior acoustic performance of the smart wearable glasses provided by the present application.

Described above are only embodiments of the present application, and it should be noted that, for those skilled in the art, improvements made without departing from the concept of the present application shall all belong to the protection scope of the present application.

What is claimed is:

1. Smart wearable glasses, comprising:
   a frame;
   temples extending from opposite sides of the frame, and being of hollow structure;
   a vibration unit fixed in the temples, comprising:
   a bone conduction contact portion at least partially exposed in the temples, configured to contact user's skull and transmit a vibration acoustic signal generated by the vibration unit to a user by means of bone conduction; the temples comprise a first body extending from the frame and a first cover fixedly covered on the first body, enclosing a first acoustic cavity together with the first body; and
   a sounding unit fixed in the temples, wherein the sounding unit is fixedly accommodated in the first acoustic cavity, the sounding unit comprising:
   a housing having an accommodation space and an inverted channel, the housing comprises: a bottom wall fixedly accommodated in the first acoustic cavity; a side wall extending from a periphery of the bottom wall to the first acoustic cavity in a curved manner; a top cover covered on the side wall; a support wall extending from the bottom wall toward the top cover; and an inverted tube cover; wherein the bottom wall, the side wall, the support wall, and the inverted tube cover together enclose the inverted channel; the bottom wall, the side wall, the support wall, and the top cover together enclose the accommodation space; wherein a first sound outlet hole, a first inverted hole, and a first leakage hole are arranged at intervals and through the housing; the first sound outlet hole, the first inverted hole, and the first leakage hole are arranged through the side wall, respectively;
   a sounding driver for emitting acoustic signal fixed in the accommodation space, and separating the accommodation space into a front cavity and a coupled rear cavity; the front cavity being connected to the outside world of the temples through the first sound outlet hole; and
   an inverted tube arranged in the inverted channel, connected to the outside world of the temples through the inverted channel and the first inverted hole in sequence, wherein the coupled rear cavity is connected to the outside world of the temples through the first leakage hole and the inverted tube; wherein
   a phase of an acoustic wave emitted by the sounding unit through the first sound outlet hole is opposite to a phase of an acoustic wave emitted by the sounding unit through the first leakage hole; a size of the inverted tube is calculated based on a volume of the front cavity, a volume of the coupled rear cavity, and a Thiele-Small (TS) parameter of the sounding driver.

2. The smart wearable glasses of claim 1, wherein the temples further comprise:
   a second sound outlet hole, a second inverted hole, and a second leakage hole respectively arranged at intervals and through the first body;
   wherein the first sound outlet hole is connected to the outside world through the second sound outlet hole, the first inverted hole is connected to the outside world through the second inverted hole, and the first leakage hole is connected to the outside world through the second leakage hole.

3. The smart wearable glasses of claim 2, wherein the temples comprise:
   a lower surface that rests on user's ears when worn;
   an upper surface opposite to the lower surface;
   a first side surface; and a second side surface; wherein the first side surface and the second side surface are connected to the upper surface and the lower surface, and are located opposite to each other; the second sound outlet hole and the second inverted hole are spaced apart on the lower surface; the second leakage hole is located on the upper surface; the first side surface is located on a side closer to the user, and the first cover is located on the first side surface.

4. The smart wearable glasses of claim 2, wherein there are a plurality of the first leakage holes and a plurality of the second leakage holes, and the first leakage holes correspond one-to-one with the second leakage holes.

5. The smart wearable glasses of claim 1, wherein the vibration unit further comprises:

a vibrator configured to generate the vibration acoustic signal;

a vibration conduction layer attached to a surface of the vibrator; and a vibration coupled anvil attached to the vibration conduction layer; wherein the bone conduction contact portion is attached to a side of the vibration coupled anvil away from the vibration conduction layer, and the vibration coupled anvil forms a bone conduction structure by coupling with the user's skull through the bone conduction contact portion.

6. The smart wearable glasses of claim 5, wherein the bone conduction contact portion is made of a flexible sound-conducting medium.

7. The smart wearable glasses of claim 1, wherein the vibration unit and the sounding unit generate sound separately by means of frequency division, wherein the frequency division comprises a physical frequency division and a software frequency division.

8. The smart wearable glasses of claim 1, wherein the housing and the temples are integrally arranged; the first sound outlet hole, the first inverted hole, and the first leakage hole are arranged through the temples, respectively.

\* \* \* \* \*